United States Patent [19]

Ghisler

[11] Patent Number: 4,955,049
[45] Date of Patent: Sep. 4, 1990

[54] METHOD OF SUPERVISING MOBILE TELEPHONE SUBSCRIPTIONS IN A MOBILE TELEPHONE SYSTEM

[75] Inventor: Walter Ghisler, Upplands Väsby, Sweden

[73] Assignee: Telefonaktiebolaget L M Ericsson, Stockholm, Sweden

[21] Appl. No.: 404,572

[22] Filed: Sep. 8, 1989

[30] Foreign Application Priority Data

Aug. 11, 1989 [SE] Sweden .............................. 8902715

[51] Int. Cl.⁵ .............................................. H04Q 7/04
[52] U.S. Cl. ........................................ 379/58; 379/63; 379/91
[58] Field of Search ...................... 379/63, 59, 60, 58, 379/62, 91, 188; 458/33; 235/380, 381, 375

[56] References Cited

U.S. PATENT DOCUMENTS

| | | | |
|---|---|---|---|
| 4,575,582 | 3/1986 | Makino | 379/63 |
| 4,646,345 | 2/1987 | Zouner et al. | 379/62 |
| 4,649,567 | 3/1987 | Childress | 455/17 |
| 4,682,357 | 7/1987 | Irino | 379/356 |
| 4,712,229 | 12/1987 | Wakamura | 379/58 |
| 4,723,264 | 2/1988 | Sasuta et al. | 379/58 |
| 4,744,101 | 5/1988 | Saegusa | 379/61 |
| 4,746,786 | 5/1988 | Heberle et al. | 235/380 |
| 4,750,201 | 6/1988 | Hodgson | 379/144 |
| 4,756,020 | 7/1988 | Fodale | 379/112 |
| 4,776,000 | 10/1988 | Parienti | 379/62 |
| 4,796,291 | 1/1989 | Makino | 379/58 |
| 4,797,948 | 1/1989 | Milliorn et al. | 455/54 |
| 4,802,201 | 1/1989 | Yoshizawa et al. | 379/62 |
| 4,817,136 | 3/1989 | Rhoads | 379/357 |
| 4,823,362 | 4/1989 | Etoh | 375/116 |
| 4,843,385 | 6/1989 | Borras | 340/825.320 |
| 4,843,622 | 6/1989 | Yotsutani et al. | 379/59 |
| 4,853,951 | 8/1989 | Bauer | 379/62 |

Primary Examiner—Robert Lev
Attorney, Agent, or Firm—Burns, Doane, Swecker & Mathis

[57] ABSTRACT

A method of supervising the subscribers in a mobile telephone system to detect audulent use of a mobile telephone. A fraudulent subscriber (MS2) can have the same identification number (12) as that (11) of a legitimate subscriber (MS1) and the operator of the system cannot discover the fraudulent use. According to the proposed method, a predetermined sequence of numbers (00, 01, . . .20) is assigned to each mobile telephone in the system. When a call is made by a subscriber across a control channel it is followed by a particular number in the sequence across the allotted voice channel and this order number is recorded in the toll-ticketing records in the mobile switching centre (MSC). When the next call is made from the same subscriber, the next order number is sent and recorded. Thus all the calls from a legitimate subscriber are recorded in a determined sequence. The order number from a fraudulent subscriber's call will break the legitimate subscriber's sequence and the fraud can be discovered by this break.

3 Claims, 1 Drawing Sheet

METHOD OF SUPERVISING MOBILE TELEPHONE SUBSCRIPTIONS IN A MOBILE TELEPHONE SYSTEM

FIELD OF THE INVENTION

The present invention relates to a method of supervising mobile telephone subscriptions in a mobile telephone system, i.e. to detect fraudulent use of a telephone set among a plurality of such sets in the system. The method can also be used for other wireless, portable or moveable devices such as data terminals mounted in the mobiles.

BACKGROUND OF THE INVENTION

In mobile telephony, the telephone instrument is not connected permanently to the network but communicates with the exchange via a so called "air interface" and a base station which is connected to the exchange. The interface may be regarded as a switch capable of connecting a plurality of various telephone instruments to a base station and to the exchange.

In ordinary wired telephone systems the exchange can identify a certain telephone set by the particular telephone line used by the subscriber. Another subscriber who fraudulently wants to use the same line must connect the set to the line which is difficult if the fraudulent user is not skilled for such technical handling.

In a mobile telephone system there is no such connection problem. Instead a fraudulent users set having the same identification code as the genuine set can use the subscription of the latter without being detected if no measures are taken, and the genuine user is billed for the fraudulent users calls.

In order to prevent fraudulent use in a mobile telephone system a supervising method implying so called "rolling keys" has been proposed. The system uses a key "K" in the mobile which indicates the authentication of the mobile. There is a non-secret initial key "$K_i$" and a new key "$K_n$" can be calculated from $K_i$ and from a random number R provided to the mobile by the network. After that this key has been used, new keys $K_{n+1}$ can be calculated from new generated random numbers. The rolling key system provides protection against fraud and may also be used to supervise that only one mobile uses the subscription. However it will normally not fully protect the subscriber from being charged for fraudulent calls since it is not the intention (and not economical) to roll the keys for each call.

SUMMARY OF THE INVENTION

In mobile telephony the telephone instrument is not connected permanently to the network. The air interface may be regarded as a switch capable of connecting various telephone instruments.

This structure must be:
  protected against calls from unauthorised mobiles.
    This is usually done by authentication and is not subject of the present invention.
  supervised in order to detect any calls that have been made from unauthorised mobiles in spite of the protection. This has not yet been done in mobile cellular systems and is the subject of the present invention.

The two parties that may suffer economically if fraud occurs inspite of the protection are the subscriber and the operator:

The subscriber may be erroneously charged by the operator for calls he did not make.

The operator will not be able to charge fraudulent calls made in his area to any subscriber.

The operator will also be correctly charged by other operators and telephone administrations for fraudulent calls, maybe expensive long distance or intenational calls, originating in his area, since it is his responsibility to detect and inhibit originating fraudulent calls.

The operator will also be erroneously charged by other operators for fraudulent calls believed to have been made by his roaming subscribers.

To protect the interests of the subscriber, it must be possible to easily detect each fraudulent call on the telephone bill, in order to reject unjustified charges. This requirement is in line with the intentions of, for example, the US laws requiring toll ticketing. Toll ticketing does not fulfill its purpose if it does not allow the subscriber to perform a check of his mobile calls with reasonable effort.

To protect the interests of the operator, it must be possible for a first operator to refuse charges from a second operator for fraudulent calls originated outside the area of the first operator.

To protect the interests of the operator, it must also be possible to prevent fraud as far as possible. But the present invention deals with detection of fraud, not with the prevention of fraud.

The present invention implies the use of call numbering. A mobile MS assigns a running number to each paging call and sends this running number to the exchange MSC together with its identification code and the called number. The running number is used for checking that the numbers of each mobile are sequential in time. To do this, the MS may firstly include the call numbers in the toll ticketing record for later check against the logged time of the record and it may secondly use the call numbers for online supervision, i.e. checking against real time that the call numbers for the subscriber in question are in sequence.

The call number may be used off line as follows: To each toll ticketing record the call number is added. When the tapes are processed a check is performed that for each subscriber any call number occurs only once; all call numbers are in sequence; The time of the day associated with the records of the calls agrees with the call number sequence.

If this is not the case, fraud or malfunction has occurred and the cause must be investigated.

The call number may be used on line as follows: The MSC receiving the call number may send a message to the responsible data base as e.g. the home MSC (HMSC) or an authentication center (AC) where a check is performed that the call number used is correct. However, for such a check to be possible it is necessary that all calls in the network are reported to their respective HMSCs or ACs.

The object of the present invention is to protect a mobile subscriber from being charged for calls he has not made and to provide an easy means for detecting such erroneous charges on the bill.

Another object of the invention is to protect a first operator from being charged for fraudulent calls by a second operator who believes the calls are originated by the first operators roaming subscribers.

The method is characterized as it appears from the appended claims.

BRIEF DESCRIPTION OF THE DRAWINGS

The invention will be further described with reference to the accompanying drawings in which.

DESCRIPTION OF PREFERRED EMBODIMENTS

Figure 1:
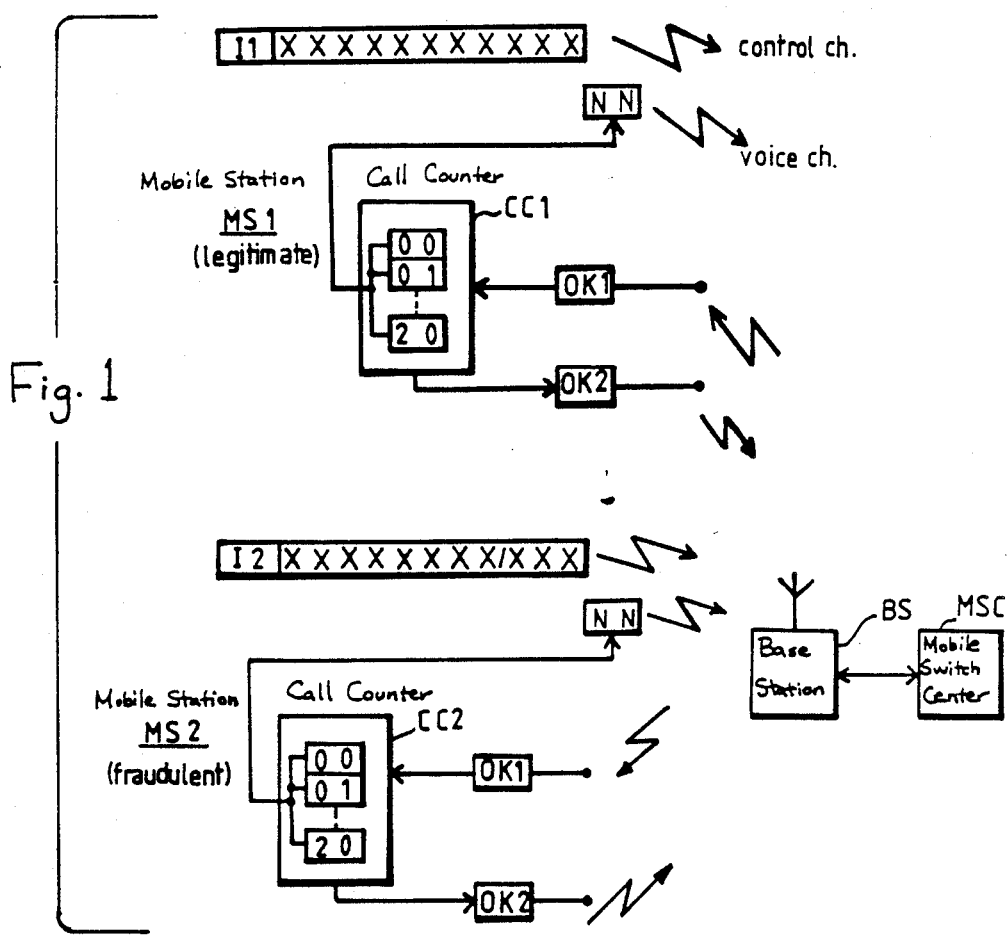
FIG. 1 shows a simplified diagram of a legitimate and a fraudulent mobile communicating with a mobile telephone exchange according to the present method.

The principle of call numbering according to the present method is shown in FIG. 1. Two mobile stations MS1 and MS2 includes each a call counter CC1 and CC2, respectively. Each counter CC1, CC2 counts a sequence of integral numbers, for example, 00, 01, ... 20 which follows the ordinary calling numbers xxx ... in a call for both mobile stations MS1, MS2. The identification code which is assumed to preclude the calling numbers are indicated by I1 and I2, respectively for the respective mobile station MS1, MS2.

The two mobile stations MS1, MS2 are communicating with a base station BS and a mobile switching centre MSC in known manner.

It is assumed that mobile station MS1 is the legitimate one and all the calls carried out by MS1 are logged on the toll ticketing tape and correctly paid in usual manner. The call from MS1 is followed by a numbering NN which is different from one call to another. The number NN is a sequential number and is provided by the counter CC1 in the following manner:

When the call with call number NN=01 has been sent to centre MSC (via BS), centre MSC sends and acknowledge signal OK1 back to the MS1. This signal OK1 is connected to the step input of counter CC1 and when signal OK1 occur, counter CC1 steps forward one step thus giving a new call number NN=02. Mobile switching centre MSC has received and acknowledged the call number NN=01. Mobile station MS1 then sends an acknowledge signal OK2 to the centre MSC saying that counting up of counter CC1 has occurred and should be performed in the centre as well. The further connection of the call and conversation can proceed in usual manner.

When NN=01 is received by MSC a provisional toll-ticketing record N* is made by MSC and when the signal OK1 is sent to the mobile MS1 a time-out is started by MSC. The reason for this is to give the mobile sufficient time to give a reply OK2 back to the centre MSC due to the propagation qualities of the radio channel (for example fading can occur).

The call from the mobile is carried out across an analog or digital control channel and after that the mobile MS1 has been assigned a voice channel, the number NN can be sent to the switching centre MSC across that voice channel.

When the call counter CC1 in MS1 has been stepped up from N to N+1 the acknowledge signal OK2 is sent to MSC. If signal OK2 is not received before time out has elapsed the call is released. If signal OK2 has been received before time out the provisional number N* is changed to N, which indicates that the counting in MS has been confirmed by MSC.

It is now assumed that mobile station MS2 is used by a fraudulent user who has succeeded in finding out the code I1 of the legitimate user, i.e. I2=I1 in FIG. 1. Fraudulent user then uses this code when calling any number xxx ... from mobile station MS2 and there is no way for the mobile switching centre MSC to detect the fraud. The fraudulent user can then continue to set up calls at the expense of the legitimate user (mobile station MS1) until the next bill is delivered to the subscriber and (if the bill is high enough) is discovered.

In accordance with the present invention there is a call counter CC2 provided in all the mobile stations of the system thus also in MS2 which counts call numbers NN and delivers one such number for each call to the mobile switching centre MSC as it has been described about for MS1. But when MS2 is sending his calling number on the same identification code the MSC will register a false calling number. Suppose, as an example that MS2 sends a calling number NN=08 to the MSC via the base station BS.

Suppose also that MS1 has sent the call number NN=10 to MSC before MS2 has started the call. Mobile switching centre MSC will then indicate a false calling number and the exact starting point of the fraud can be detected by the system and hence the point where the billing of the subscriber should stop. The MSC will send an acknowledge signal OK2 back to the fraudulent subscriber (provided that the conditions given above are fullfilled) and the call from the fraudulent subscriber can be continued on a normal way. But the centre MSC will register that the order number for the call from mobile MS2 is not correct.

There are some details of the counting algorithm which will be further described.

If during a first call the signal OK1 has been sent but OK2 has not been received, the MSC does not know whether the mobile has counted up or not. During the next call the mobile will therefore be allowed to send N or N+1 at call start. This special situation requires that the first call is registered as a toll ticketing record with the flagged number N* to indicate the failed signaling and the permission to reuse the number N for the next call record, and that the first call is released when OK2 has not been received within a time out limit to make non-paying fraudulent calls impossible.

During the first call the call number recorded on the toll ticketing record was N* or N depending on how complete the signaling was:

|  | Counter in MS | TT-record |
|---|---|---|
| First, MSC receives N | N | set N* |
| Then, MS receives OK1 | set N + 1 | N* |
| Then, MSC receives OK2 | N + 1 | set N |

During the next call the call number recorded on the TT-record is N* or N or (N+1)* or (N+1) depending on how complete the signaling was:

| First, if MSC receives N | N | set N* |
|---|---|---|
| Then, MS receives OK1 | set N + 1 | N* |
| Then, MSC receives OK2 | N + 1 | set N |
| and: | | |
| First, if MSC receives N + 1 | N + 1 | set (N + 1)* |
| Then, MS receives OK1 | set (N + 1) + 1 | (N + 1)* |
| Then, MSC receives OK2 | (N + 1) + 1 | set (N + 1) |

The number of bits used for numbering calls is not critical to the supervision function. 10 bits is probably a reasonable suggestion.

Figure 2:
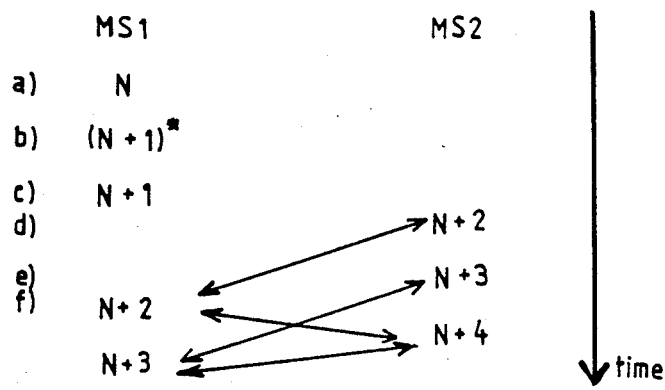
FIG. 2 shows a chart over a recording example illustrating fraud detection.

FIG. 2 gives a toll ticketing record example showing fraud detection relating to FIG. 1. The steps in the list of FIG. 2 are as follows:

(a) legitimate call numbered N (b) legitimate call numbered (N+1)* because aborted (bad signaling)

(c) legitimate call numbered N+1 because of no stepping up of count (d) fraudulent call numbered N+2. Count seems to have been known to the MS2 by listening to the signaling of the previous call on the air interface.

(e) next call of MS2

(f) next call of MS1 etc.

The program checking the TT-records will find that the first fraudulent call d) is one of the two calls numbered N+2. These two and all subsequent calls cannot be identified as legitimate and must therefore not be billed to MS1. However the subscriber of MS1 may be invited to pay for those calls numbered N+2 and higher which he can identify on the B-number as being his calls. Detectable conflicts are indicated by the arrows and all the calls are recorded on the toll-ticketing record of MS1 (both columns in FIG. 2).

I claim:

1. A method of supervising mobile telephone subscriptions in a mobile telephone system including a number of mobile stations (MS1, MS2) and at least one fixed station (MSC), characterized in assigning to each mobile station (MS1) a first predetermined sequence of numbers and numbering the calls chargeable to a particular subscription by said first sequence of numbers, signalling these numbers from the mobile station (MS1) to the fixed station (MSC) in a second predetermined sequence (NN), one number for each paying call when a call is made, recording said second predetermined sequence (NN) of numbers together with the subscription number and a certain point of time.

2. A method as claimed in claim 1, characterized in the further subsequent steps:

returning a first acknowledge signal (OK1) from said fixed station (MSC) to said mobile station (MS1) after said signalling of a particular number (NN=01) and after that said particular number has been registered for the call from the mobile station (MS1), said first acknowledge signal stepping said first sequence of numbers forward to a next number in the sequence, and sending a second acknowledge signal (OK2) from the mobile station (MS1) to the fixed station (MSC) indicating said stepping of the first sequence (NN) and confirming a recording of said particular number (NN=01) in the fixed station (MSC).

3. A method as claimed in claim 2, characterized in that upon said returning of the first acknowledge signal (OK1), a time out is started in said fixed station (MSC) in order to provide for the propagation qualities of the communication medium between said mobile station (MS1) and said fixed station (MSC).

* * * * *